US011172725B2

(12) United States Patent
Petersen et al.

(10) Patent No.: US 11,172,725 B2
(45) Date of Patent: Nov. 16, 2021

(54) BOOTS WITH POLYMERIC FOAM SHELL AND EXPOSED SOCK LINER

(71) Applicant: Tingley Rubber Corporation, Piscataway, NJ (US)

(72) Inventors: Robert N. Petersen, Somerset, NJ (US); Steven A. Smith, Pompton Plains, NJ (US); James P. Towey, Nutley, NJ (US); Michael S. Zedalis, Mendham, NJ (US)

(73) Assignee: Tingley Rubber Corporation, Piscataway, NJ (US)

( * ) Notice: Subject to any disclaimer, the term of this patent is extended or adjusted under 35 U.S.C. 154(b) by 8 days.

(21) Appl. No.: 16/597,438

(22) Filed: Oct. 9, 2019

(65) Prior Publication Data

US 2020/0113270 A1 Apr. 16, 2020

Related U.S. Application Data

(60) Provisional application No. 62/743,731, filed on Oct. 10, 2018.

(51) Int. Cl.
| | |
|---|---|
| *A43B 1/14* | (2006.01) |
| *A43B 1/10* | (2006.01) |
| *A43B 23/02* | (2006.01) |
| *B29D 35/00* | (2010.01) |
| *B29K 23/00* | (2006.01) |
| *B29K 105/04* | (2006.01) |

(52) U.S. Cl.
CPC .................. *A43B 1/14* (2013.01); *A43B 1/10* (2013.01); *A43B 23/026* (2013.01); *B29D 35/0009* (2013.01); *B29K 2023/083* (2013.01); *B29K 2105/04* (2013.01)

(58) Field of Classification Search
CPC ........... A43B 1/10; A43B 1/14; A43B 23/026; A43B 23/0215; A43B 23/0235
USPC ............................................................ 36/87
See application file for complete search history.

(56) References Cited

U.S. PATENT DOCUMENTS

| | | | | |
|---|---|---|---|---|
| 2,403,442 A | * | 7/1946 | Klaus ...................... | A43B 13/41 36/87 |
| 3,823,493 A | * | 7/1974 | Brehm ...................... | A43B 3/02 36/109 |
| 4,188,680 A | | 2/1980 | Richard | |
| 4,619,854 A | * | 10/1986 | Penttinen ................. | D06N 3/06 428/99 |
| 4,845,862 A | * | 7/1989 | Phillips, Jr. .............. | A43B 1/14 36/83 |
| 5,189,814 A | | 3/1993 | Barma | |
| 5,308,420 A | | 5/1994 | Yang | |
| 5,413,846 A | | 5/1995 | Besana | |
| (Continued) | | | | |

FOREIGN PATENT DOCUMENTS

CA 2245024 A1 4/1999

*Primary Examiner* — Marie D Bays
(74) *Attorney, Agent, or Firm* — Servilla Whitney LLC

(57) ABSTRACT

A boot comprises: a shell comprising a first foamed polymeric material; a sock liner comprising a second foamed polymeric material, the sock liner having an exposed section and an enclosed section; and an adhesive layer affixing the shell and the enclosed section of the sock liner; wherein there is an absence of intermingling of the second surface of the enclosed section of the sock liner with the inner surface of the shell. Methods of making and using the boot are also provided.

18 Claims, 5 Drawing Sheets

(56) References Cited

U.S. PATENT DOCUMENTS

| | | |
|---|---|---|
| 5,546,680 A | 8/1996 | Barma et al. |
| 5,647,150 A * | 7/1997 | Romanato ............ A43B 3/0084 12/142 R |
| D382,692 S | 8/1997 | Carlson |
| 5,785,909 A | 7/1998 | Chang et al. |
| 5,832,632 A | 11/1998 | Bergeron |
| 5,885,500 A | 3/1999 | Tawney et al. |
| 5,937,543 A | 8/1999 | Hall et al. |
| 6,237,254 B1 | 5/2001 | Rork et al. |
| 6,299,817 B1 | 10/2001 | Parkinson |
| 6,346,207 B1 | 2/2002 | Liu |
| 6,427,362 B2 | 8/2002 | Rork et al. |
| 6,442,873 B2 | 9/2002 | Rork et al. |
| 6,753,369 B2 | 6/2004 | Hill, Jr. et al. |
| 6,993,858 B2 | 2/2006 | Seamans |
| 7,316,083 B2 | 1/2008 | Labonté |
| 7,584,552 B2 | 9/2009 | Krauss |
| 8,028,351 B2 | 10/2011 | Stachler et al. |
| 8,443,464 B2 | 5/2013 | Schumacher |
| D683,530 S | 6/2013 | Barker et al. |
| 8,555,437 B2 | 10/2013 | Gorovitz |
| D701,374 S | 3/2014 | Feller et al. |
| D707,427 S | 6/2014 | Barker |
| 8,745,897 B2 | 6/2014 | Wojnar et al. |
| 8,789,292 B2 | 7/2014 | Ludemann et al. |
| D712,638 S | 9/2014 | Barker et al. |
| 8,883,058 B2 * | 11/2014 | Cook .................... A43B 23/04 264/244 |
| 8,984,776 B2 * | 3/2015 | Ludemann ............ B29D 35/146 36/109 |
| 9,204,685 B2 | 12/2015 | Ludemann et al. |
| 9,215,907 B2 | 12/2015 | Linth et al. |
| D762,370 S | 8/2016 | Barker |
| D769,588 S | 10/2016 | Barker et al. |
| D781,030 S | 3/2017 | Foust |
| D781,031 S | 3/2017 | Dowd et al. |
| D782,166 S | 3/2017 | Feller et al. |
| 9,591,888 B2 | 3/2017 | Linth et al. |
| D783,240 S | 4/2017 | Foust et al. |
| 9,642,416 B2 | 5/2017 | Ludemann et al. |
| D838,946 S | 1/2019 | Barker et al. |
| D839,580 S | 2/2019 | Dowd et al. |
| D846,859 S | 4/2019 | Foust |
| 2002/0012784 A1 * | 1/2002 | Norton ............... A43B 23/0295 428/304.4 |
| 2003/0233771 A1 * | 12/2003 | Soon ..................... B29D 35/02 36/55 |
| 2004/0020077 A1 * | 2/2004 | Thomas .................. A43B 7/12 36/4 |
| 2006/0068140 A1 | 3/2006 | Flather et al. |
| 2009/0320190 A1 | 12/2009 | Waters et al. |
| 2010/0205717 A1 * | 8/2010 | McClintock ......... A43B 13/122 2/82 |
| 2011/0265350 A1 | 11/2011 | Bible |
| 2012/0004489 A1 | 1/2012 | Mills et al. |
| 2013/0133229 A1 * | 5/2013 | Ludemann ........... A43B 23/026 36/109 |
| 2014/0262010 A1 * | 9/2014 | Heineck ............ B29C 66/81263 156/275.5 |
| 2015/0150339 A1 | 6/2015 | Van Hook |
| 2015/0335097 A1 | 11/2015 | Bisson |
| 2017/0129205 A1 * | 5/2017 | Park ..................... A43B 17/006 |
| 2018/0343972 A1 * | 12/2018 | Wang ...................... A43B 7/12 |
| 2019/0297990 A1 * | 10/2019 | Ludemann ......... A43B 23/0215 |
| 2019/0297991 A1 * | 10/2019 | Bongers ............... A43B 23/088 |

* cited by examiner

BOOTS WITH POLYMERIC FOAM SHELL AND EXPOSED SOCK LINER

CROSS-REFERENCE TO RELATED APPLICATION

This application claims priority under 35 U.S.C. § 119(e) to U.S. Provisional Application No. 62/743,731, filed Oct. 10, 2018, the disclosure of which is incorporated herein by reference in its entirety.

TECHNICAL FIELD

The present disclosure generally relates to versatile boots comprising a polymeric foamed shell and an exposed sock liner.

BACKGROUND

Boots for work and recreation provide protection and support to wearer's feet and legs. Making such boots sturdy, comfortable, lightweight, and water-resistant are desired enhancements. Currently, there are boots for work and recreation that have exposed sock liners in combination with a shell or layer that covers a foot and portions of a leg. The shells of such boots are made of traditional rubbers and polymers that are not foamed and have densities in excess of 1.0 gm/cc. In some instances, the traditional rubber shell is applied in pieces to the sock liner, which is also labor intensive.

There is an on-going need to provide boots that are comfortable while providing support and water resistance.

SUMMARY

In an aspect, a boot comprises: a shell comprising a first foamed polymeric material; and a sock liner comprising a second foamed polymeric material, the sock liner having an exposed section and an enclosed section; wherein there is an absence of intermingling of the second surface of the enclosed section of the sock liner with the inner surface of the shell. The boots herein may be knee boots, mid-calf boots, or ankle boots depending on where a top edge of the boot is located upon donning by a wearer. The boot may further comprise an adhesive layer affixing an inner surface of the shell and a second surface of the enclosed section of the sock liner. The adhesive layer may have a thickness spanning between the inner surface of the shell and the outer surface of the enclosed section of the sock liner.

In a specific aspect, a boot comprises: a shell comprising a foamed an ethylene vinyl acetate (EVA) polymer; a sock liner comprising a foamed neoprene material, the sock liner having an exposed section and an enclosed section; and an adhesive layer affixing an inner surface of the shell and a second surface of the enclosed section of the sock liner, and having a thickness spanning between the inner surface of the shell and the outer surface of the enclosed section of the sock liner; wherein there is an absence of intermingling of the second surface of the enclosed section of the sock liner with the inner surface of the shell.

Another aspect is a method of making a boot comprising: injecting a foamable polymeric material into a mold cavity to form a shell comprising a first foamed polymeric material; disposing a sock liner comprising a second foamed polymeric material on a boot last; supplying an adhesive to a surface of the sock liner, the shell, or both; assembling the boot last on which the sock liner is disposed and the shell; forming an adhesive layer between an inner surface of the shell and a second surface of an enclosed section of the sock liner, wherein there is an absence of intermingling of the second surface of the enclosed section of the sock liner with the inner surface of the shell; affixing the inner surface of the shell and the second surface of the enclosed section of the sock liner to assemble an interim article; and exposing the interim article to heating conditions for drying the adhesive and/or curing the adhesive and the shell to form the boot.

In an embodiment, during assembly of the boot last on which the sock liner is exposed and the shell, the shell is in an expanded state, and upon cooling and shrinkage of the shell, the adhesive layer is formed from the adhesive.

In another embodiment, the boot last is expandable, and wherein during assembly of the boot last on which the sock liner is exposed and the shell, the boot last is in a first deflated position, and upon supply of a pressure source to the boot last, the boot last moves from the first deflated position to a second inflated position thereby forming the adhesive layer from the adhesive.

DETAILED DESCRIPTION

The boots disclosed herein have advantages in that they are sturdy, comfortable, thermally insulative, and provide excellent liquid and/or water resistance. Methods of construction of the boot allow for separate formation of a shell and a sock liner for facilitating assembly. Therebetween, an adhesive layer is formed for affixing a sock liner of a foamed polymeric material to a shell also of a foamed polymeric material. The overall boot is light and insulating. The boots herein are advantageous over prior art boots using unfoamed shells in that the lighter-weight foamed polymer material reduces overall weight of the boot while providing excellent chemical and water resistance and insulating properties. Foamed shells of an ethylene vinyl acetate (EVA) polymer are particularly advantageous due to ease of manufacture and handling, low density (ranging from 0.23-0.50 gm/cc) and its insulating properties.

Reference herein to "knee boot" refers to footwear designed to protect feet and lower legs, with a top of the boot extending nominally towards a wearer's knee. That is, a boot that is a knee boot covers all or a portion of a wearer's ankle and calf and may extend to the wearer's knee or just below it.

Reference herein to "mid-calf boot" refers to footwear designed to protect feet and lower legs, with a top of the boot extending nominally on a portion of a wearer's calf. That is, a boot that is a mid-calf boot covers all or a portion of a wearer's ankle and a portion of the calf.

Reference herein to "ankle boot" refers to footwear designed to protect feet and ankles, with a top of the boot extending nominally just at or past a wearer's ankles. That is, a boot that is an ankle boot covers all or a portion of a wearer's ankles and not a significant portion of the leg above the ankles.

Reference herein to "sock liner" refers to a structure that is designed to receive a foot and a portion of a leg.

Before describing several exemplary embodiments of the invention, it is to be understood that the invention is not limited to the details of construction or process steps set forth in the following description. The invention is capable of other embodiments and of being practiced or being carried out in various ways.

Figure 1:
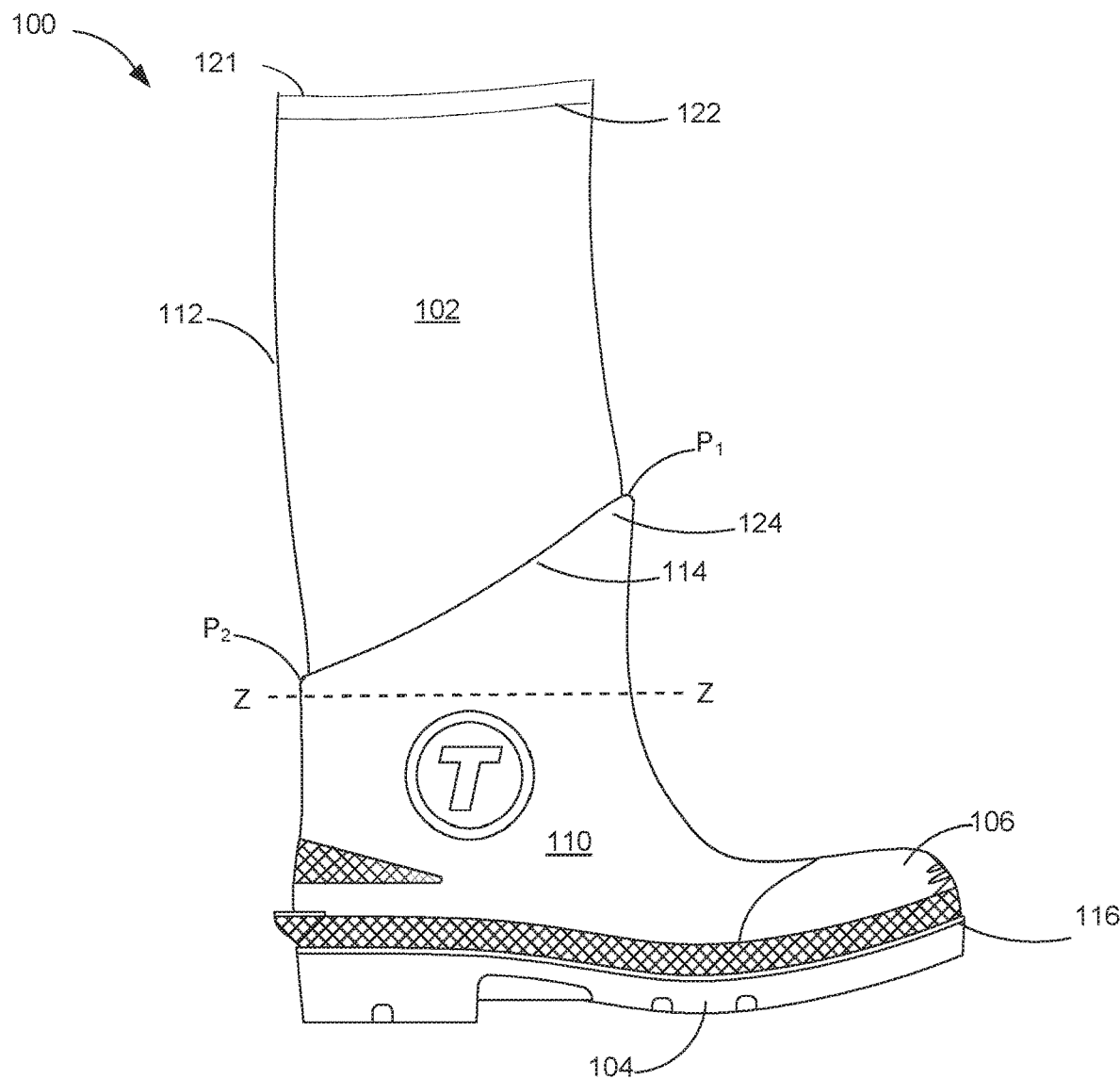
FIG. 1 is a schematic side view of a boot according to an embodiment.

Turning to the figures, FIG. 1 is a schematic side view of a boot 100, which is symmetric, comprising a top edge 121, a sock liner 102, a shell 110, and an outsole 104. A toe box 106 is generally at a front side of the boot. The shell 110 has a first edge 114 where it meets an exposed section 112 of the sock liner 102 and a bottom edge 116 where it meets the outsole 104. The first or primary edge 114 of the shell 110 from the side view extends from a front point $P_1$ at the front side of the boot to a back point $P_2$ at a back side of the boot in a slight continuous curve. The shape of the first or primary edge 114 may be modified according to comfort and utility of the boot. In the embodiment of FIG. 1, the front point $P_1$ is positioned at a distance closer to the boot top edge 121 as compared to the pack point $P_2$. The positioning of the front point $P_1$ creates a support section 124 for protecting a shin of a wearer. Optionally, a seam 122 may present on the sock liner 102 near the top edge 121.

Figure 2:
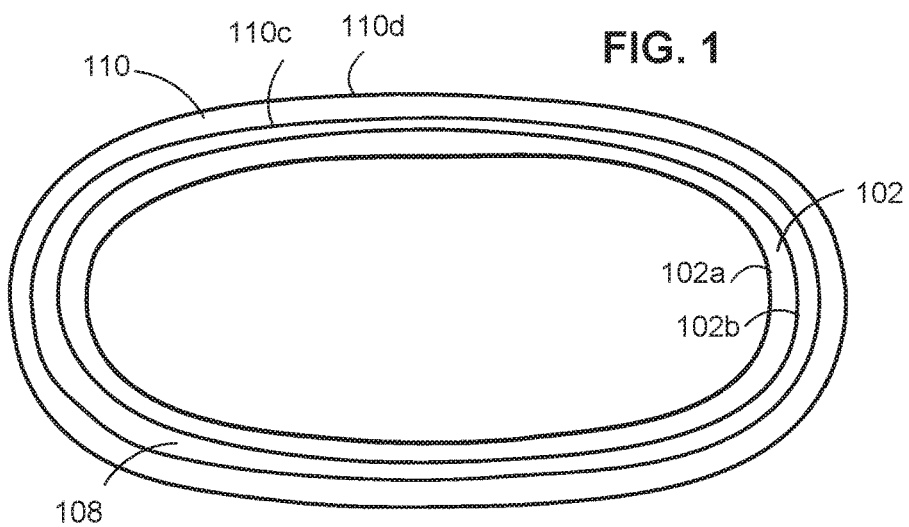
FIG. 2 is an enlarged cross-section view of the boot of FIG. 1 along line Z-Z.

In FIG. 2, an enlarged cross-section view along line Z-Z of FIG. 1 is provided, showing the shell 110 having an inner surface 110c and an exterior surface 110d, and the sock liner 102 having a liner inner surface 102a, and a second surface 102b opposite the liner inner surface 102a. In one or more embodiments, an adhesive layer 108 affixes the shell and the enclosed section of the sock liner. There is an absence of intermingling of the second surface 102b of the enclosed section of the sock liner 102 with the inner surface 110c of the shell 110. The adhesive layer intermingles with each of the second surface 102b and the inner surface 110c, and may have a measurable thickness between the shell and the sock liner.

Figure 3:
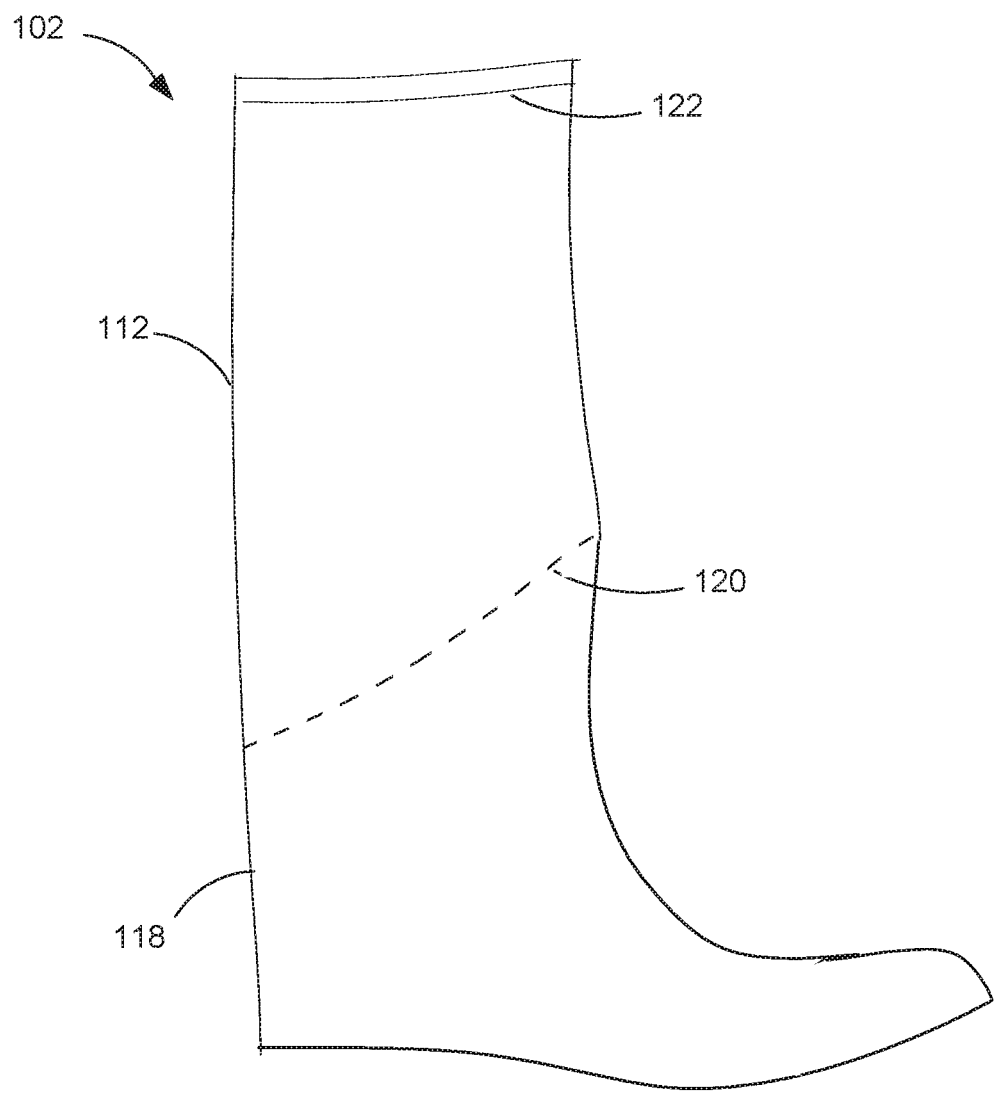
FIG. 3 is a schematic side view of a sock liner according to an embodiment.

In FIG. 3, an embodiment of the sock liner 102 is shown comprising the seam 122, the exposed section 112, and an enclosed section 118, where the exposed section 112 ends and the enclosed section begins nominally at location 120, where the edge of shell (not shown) is located upon assembly.

Figure 4:
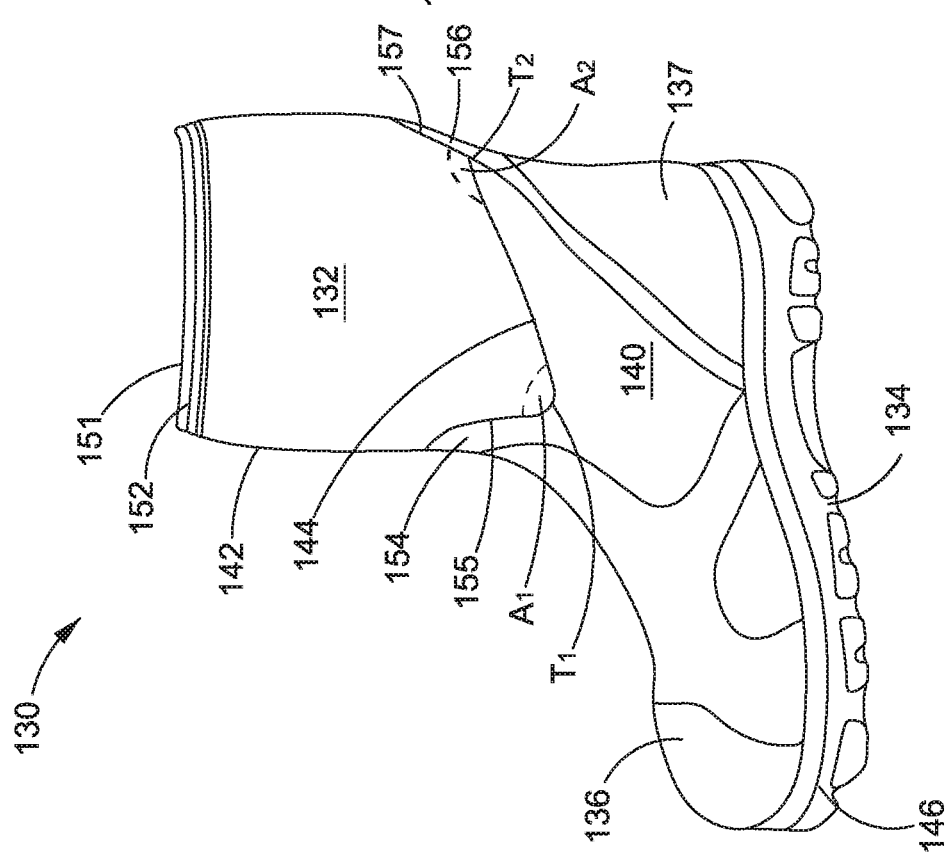

FIG. 4 is a schematic side view of a boot 130, which is symmetric, considered a mid-calf design, comprising a top edge 151, a sock liner 132, a shell 140, and an outsole 134. A toe box 136 is generally at a front side of the boot. A heel counter 137 is generally at a back side of the boot. The shell 140 has a first or primary edge 144 where it meets an exposed section 142 of the sock liner 132 and a bottom edge 146 where it meets the outsole 134. The shell 140 further comprises the following support sections: front support section 154 and back support section 156 defined by second edge 155 and third edge 157, respectively, which independently angularly extend from the first or primary edge 144. The first or primary edge 144 of the shell 140 extends one direction from a front transition point $T_1$ and the second edge 155 extends in the other direction from the front transition point $T_1$. Likewise, the first or primary edge 144 of the shell 140 extends one direction from a back transition point $T_2$ and the third edge 157 extends in the other direction from the back transition point $T_2$. The first or primary edge 144 of the shell 140 spans $T_1$ to $T_2$ in a substantially linear manner. The shape of the first or primary edge 144 may be modified according to comfort and utility of the boot. In the embodiment of FIG. 4, $T_1$ is positioned at a distance farther from the boot top edge 151 as compared to $T_2$. The positionings of $T_1$ and the second edge 155 create a support section 154 for protecting a shin of a wearer. The positionings of $T_2$ and the third edge 157 create a support section 156 for protecting a calf of a wearer. Moreover, the position of $T_1$ a distance farther from the boot top edge 151 as compared to $T_2$ creates added flexibility to the shell 140 during wear, which improves overall comfort.

In one or more embodiments, the primary edge 144 extends between the front transition point $T_1$ and the back transition point $T_2$ at an angle of greater than or equal to 30 degrees relative to the top edge 151 of the boot 130. In a preferred embodiment, the angle is greater than or equal to 45 degrees and less than or equal to 75 degrees, and all values and subranges therebetween.

In one or more embodiments, the second edge 155 extends from the first or primary edge 144 at an angle $A_1$ in a range of greater than or equal to 45 degrees to less than or equal to 125 degrees, and all values and subranges therebetween. In a preferred embodiment, $A_1$ is 90 degrees ±10 degrees.

In one or more embodiments, the third edge 157 extends from the first or primary edge 144 at an angle $A_2$ in a range of greater than or equal to 135 degrees to less than or equal to 175 degrees, and all values and subranges therebetween. In a preferred embodiment, $A_2$ is 90 degrees ±10 degrees.

In one or more embodiments, $A_1$ has the same value as $A_2$. In one or more embodiments, $A_1$ is less than $A_2$. In one or more embodiments, $A_1$ is greater than $A_2$.

In one or more embodiments, the heel counter 137 is continuous with the back support section 156.

Optionally, a seam 152 may present on the sock liner 132 near the top edge 151.

Figure 5:
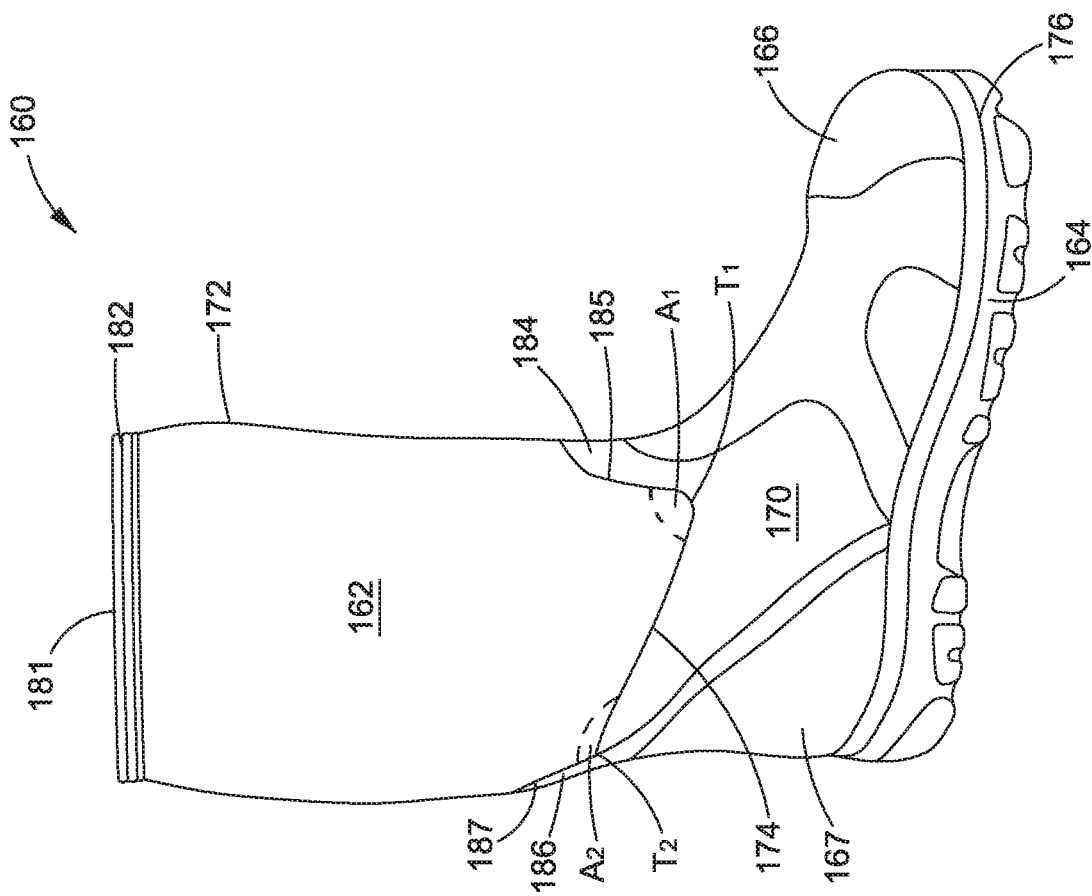
FIGS. 4-5 are schematic side views of boots according to embodiments.

FIG. 5 is a schematic side view of a boot 160, which is symmetric, considered a knee boot design, comprising a top edge 181, a sock liner 162, a shell 170, and an outsole 164. A toe box 166 is generally at a front side of the boot. A heel counter 167 is generally at a back side of the boot. The shell 170 has a first or primary edge 174 where it meets an exposed section 172 of the sock liner 162 and a bottom edge 176 where it meets the outsole 164. The shell 170 further comprises the following support sections: front support section 184 and back support section 186 defined by second edge 185 and third edge 187, respectively, which independently angularly extend from the first or primary edge 174. The first or primary edge 174 of the shell 170 extends one direction from a front transition point $T_1$ and the second edge 185 extends in the other direction from the front transition point $T_1$. Likewise, the first or primary edge 174 of the shell 170 extends one direction from a back transition point $T_2$ and the third edge 187 extends in the other direction from the back transition point $T_2$. The first or primary edge 174 of the shell 170 spans $T_1$ to $T_2$ in a substantially linear manner. The shape of the first or primary edge 174 may be modified according to comfort and utility of the boot. In the embodiment of FIG. 5, $T_1$ is positioned at a distance farther from the boot top edge 181 as compared to $T_2$. The positionings of $T_1$ and the second edge 185 create a support section 184 for protecting a shin of a wearer. The positionings of $T_2$ and the third edge 187 create a support section 186 for protecting a calf of a wearer. Moreover, the position of $T_1$ a distance farther from the boot top edge 181 as compared to $T_2$ creates added flexibility to the shell 170 during wear, which improves overall comfort.

In one or more embodiments, the primary edge 174 extends between the front transition point $T_1$ and the back transition point $T_2$ at an angle of greater than or equal to 30 degrees relative to the top edge 181 of the boot 160. In a preferred embodiment, the angle is greater than or equal to 45 degrees and less than or equal to 75 degrees, and all values and subranges therebetween.

In one or more embodiments, the second edge 185 extends from the first or primary edge 174 at an angle $A_1$ in a range of greater than or equal to 45 degrees to less than or equal to 125 degrees, and all values and subranges therebetween. In a preferred embodiment, $A_1$ is 90 degrees ±10 degrees.

In one or more embodiments, the third edge 187 extends from the first or primary edge 174 at an angle $A_2$ in a range of greater than or equal to 135 degrees to less than or equal to 175 degrees, and all values and subranges therebetween. In a preferred embodiment, $A_2$ is 90 degrees ±10 degrees.

In one or more embodiments, $A_1$ has the same value as $A_2$. In one or more embodiments, $A_1$ is less than $A_2$. In one or more embodiments, $A_1$ is greater than $A_2$.

In one or more embodiments, the heel counter 167 is continuous with the back support section 186.

Optionally, a seam 122 may present on the sock liner 132 near the top edge 181.

The shell in accordance with this disclosure is made from a first foamed polymeric material. The shell is designed to provide excellent insulating and water resistance properties. The shell may be made from any polymeric materials that are foamable and injection moldable. The shell may be made from materials having a density lower than that of natural rubber. The foamed polymeric materials of the shell are preferably lightweight and/or resistant to ozone cracking. As desired, the shell can be further designed to provide chemical resistance and abrasion resistance.

In one or more embodiments, the first foamed polymeric material comprises an ethylene vinyl acetate (EVA) polymer. Use of an EVA polymer can be advantageous in that foamed EVA is an excellent insulator. The first foamed polymeric material may optionally comprise additives or other blended polymeric material that can provide enhanced properties. Optional additives include but are not limited to colorants. Other polymeric material includes but is not limited to chlorinated polyethylene. Foamed EVA is also advantageous in that once a shell is injection-molded, it expands upon opening of the mold. Expansion is expected to be about 150% by volume. While a shell of foamed EVA is warm and in its expanded size, it can readily be assembled in a continuous process with a sock liner. Upon cooling of the foamed EVA shell and its contraction or shrinkage (estimated to be in the range of 4-5%), a friction fit with a portion of the sock liner is created. Moreover, affixing the sock liner to the foamed EVA shell can be enhanced by including one or more adhesive-components on an inside surface of the shell and/or an outside surface of a portion of the sock liner, which an adhesive layer upon shrinkage of the EVA shell during cooling. The recognition of the property of EVA to expand and contract leads to efficiencies in raw material usage and underlying mold fabrication, and aids the overall manufacturing process, while taking advantage to the natural shrinkage of the EVA to form a strong and lasting bond between the shell and sock liner.

In one or more embodiments, the first foamed polymeric material comprises a combination of an ethylene vinyl acetate (EVA) polymer and a chlorinated polyethylene. In one or more embodiments, the first foamed polymeric material comprises a combination of greater than or equal to 30% to less than or equal to 50% by weight, and all values and subranges therein, of an ethylene vinyl acetate (EVA) polymer and greater than or equal to 50% to less than or equal to 70% by weight, and all values and subranges therein, of a chlorinated polyethylene. In one or more embodiments, the first foamed polymeric material does not include any natural rubber materials.

The sock liner in accordance with this disclosure is made from a second foamed polymeric material. The sock liner is designed to provide flexible comfort, pliability during wear, and insulating features. In one or more embodiments, the second foamed polymeric material comprises: natural rubber, polychloroprene, nitrile butadiene rubber, polyisoprene, desert guayule, other polymeric materials that lend themselves to foaming, or combinations thereof.

The adhesive may be any adhesive that provides suitable bonding performance between the first foamed polymeric material and the second foamed polymeric material. In one or more embodiments, an EVA-based adhesive is used. The adhesive forms an adhesive layer upon formation of the boot. The adhesive has a thickness that spans between the first foamed polymeric material and the second foamed polymeric material. The adhesive's composition and positioning precludes intermingling of the second surface of the enclosed section of the sock liner with the inner surface of the shell.

The outsole generally comprises a polymeric material that may be the same or that may be different from the polymeric material of the shell depending upon the desired functionality of the footwear, but which is compatible to facilitate attachment of the outsole to the shell. The outsole can be molded into the shell, or an outsole can be adhesively bonded to the base of the shell. Suitable outsoles can be nitrile butadiene rubber or other chemical resistant elastomers.

A midsole is optionally located between the shell and the outsole. The midsole can provide enhancements to the boot such as insulation and/or cushioning. The midsole generally comprises a polymeric material that may be the same or that may be different from the polymeric material of the shell depending upon the desired functionality of the footwear, but which is compatible to facilitate attachment of midsole to both the outsole to the shell. The midsole can be molded into the shell, or the midsole can be adhesively bonded to the base of the shell. Suitable midsoles can be EVA or other polymeric materials.

Figure 6:
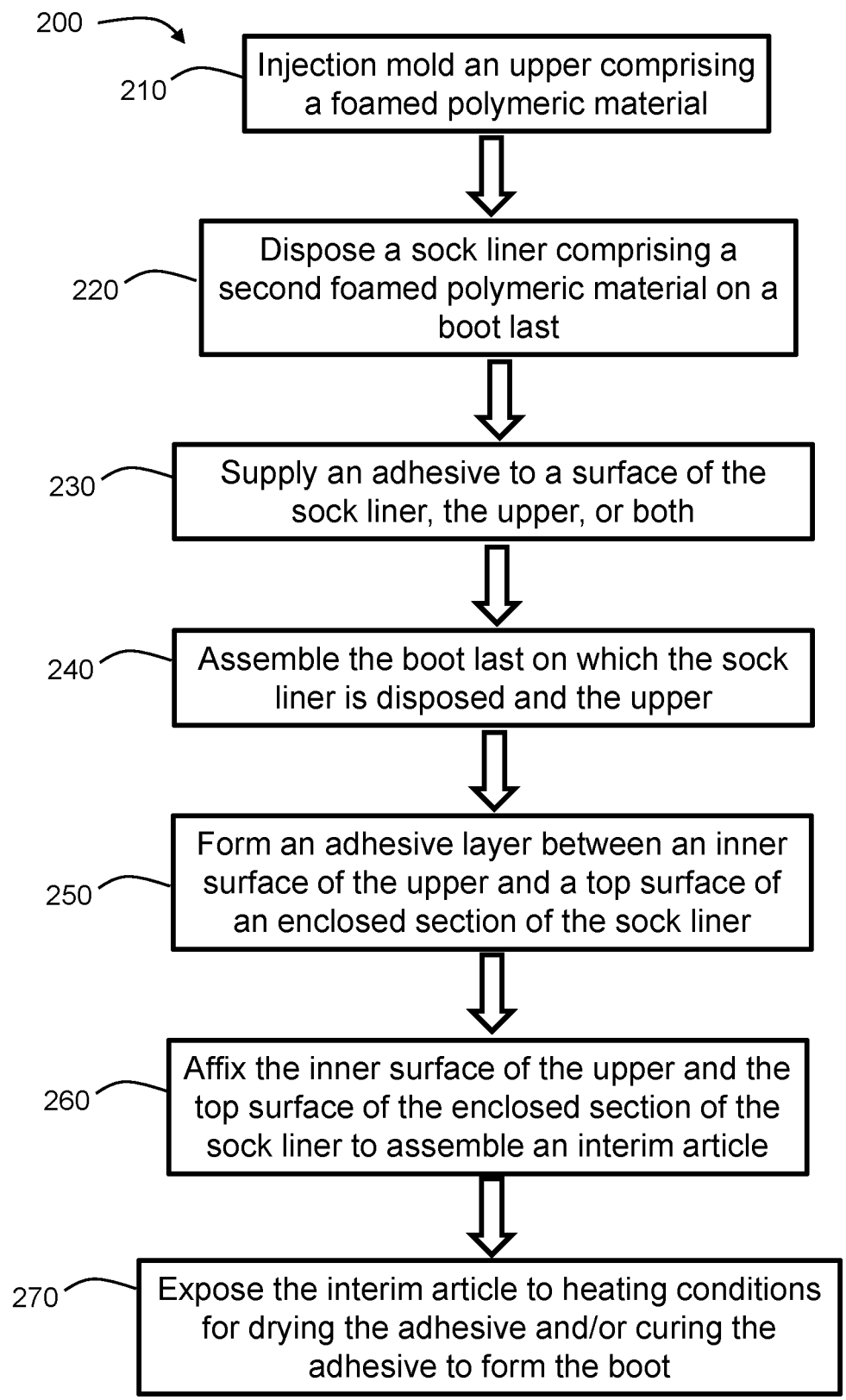
FIG. 6 is a process flow chart of a method according to an embodiment.

In FIG. 6, a process flow chart of a method 200 according to an embodiment is provided. At 210, a shell is formed by injection molding a foamable polymeric material into a mold cavity, the shell comprising a first foamed polymeric material. At 220, a sock liner comprising a second foamed polymeric material is disposed on a boot last. At 230, an adhesive is supplied to a surface of the sock liner, the shell, or both. In an embodiment, the adhesive is applied to the second surface of the sock liner. In an embodiment, the adhesive is applied to the inner surface of the shell. In an embodiment, adhesive is supplied to both the second surface of the sock liner and the inner surface of the shell. In a detailed embodiment, a first adhesive-component is supplied to the second surface of the sock liner and a second adhesive-component is supplied to the inner surface of the shell such that upon contact and optionally heat, the first adhesive-component is reactive with the second adhesive-component. Application of the adhesive may be done by methods including but not limited to: spray methods, for example aerosol spray; brush-on methods; and dipping methods.

At 240, the boot last on which the sock liner is disposed and the shell are assembled. In an embodiment, the sock liner disposed on the boot last is inserted into the shell. In another embodiment, the shell is donned onto the sock liner disposed on the boot last.

At 250, an adhesive layer is formed between the shell and an enclosed section of the sock liner, wherein there is an absence of intermingling of the second surface of the enclosed section of the sock liner with the inner surface of the shell.

In an embodiment, during assembly of the boot last on which the sock liner is exposed and the shell, the shell is in an expanded state, and upon cooling and shrinkage of the shell, the adhesive layer is formed from the adhesive.

In another embodiment, the boot last is expandable, and wherein during assembly of the boot last on which the sock liner is exposed and the shell, the boot last is in a first deflated position, and upon supply of a pressure source to the boot last, the boot last moves from the first deflated position to a second inflated position thereby forming the adhesive layer from the adhesive.

The methods herein result in a substantially uniform distribution of the adhesive between the shell and the sock liner.

At 260, the inner surface of the shell and the second surface of the enclosed section of the sock liner are affixed to assemble an interim article. To the interim article other features may be added, for example an outsole.

At 270, the interim article is exposed to heating conditions for drying the adhesive and/or curing the adhesive to form the boot.

Thereafter, the boot may be further adorned and finished.

Figure 7:
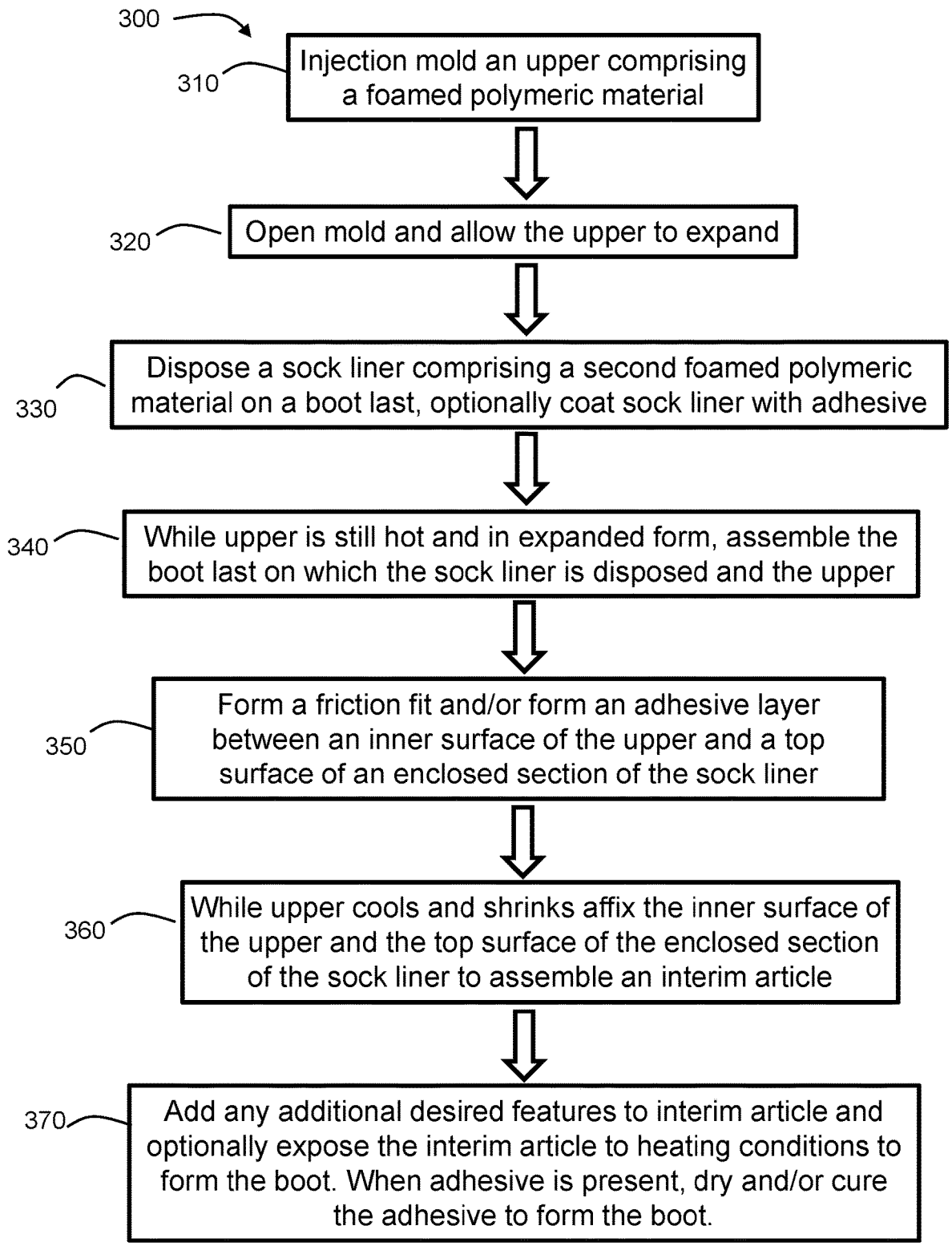
FIG. 7 is a process flow chart of another method according to an embodiment.

In FIG. 7, a process flow chart of a method 300 according to an embodiment is provided. At 310, a shell is formed by injection molding a foamable polymeric material into a mold cavity, the shell comprising a first foamed polymeric material. In one or more embodiments, the shell is formed by using ethylene vinyl acetate (EVA) and a blowing agent. At 320, the mold is opened and the shell expands. At 330, a sock liner comprising a second foamed polymeric material is disposed on a boot last, and optionally, an adhesive is supplied to a surface of the sock liner, the shell, or both. In an embodiment, the adhesive is applied to the second surface of the sock liner. In an embodiment, the adhesive is applied to the inner surface of the shell. In an embodiment, adhesive is supplied to both the second surface of the sock liner and the inner surface of the shell. Application of the adhesive may be done by methods including but not limited to: spray methods, for example aerosol spray; brush-on methods; and dipping methods.

At 340, while the shell is still hot and in expanded form, the boot last on which the sock liner is disposed and the shell are assembled. In an embodiment, the sock liner disposed on the boot last is inserted into the shell. In another embodiment, the shell is donned onto the sock liner disposed on the boot last.

At 350, a friction fit and/or an adhesive layer is formed between the shell and an enclosed section of the sock liner, wherein there is an absence of intermingling of the second surface of the enclosed section of the sock liner with the inner surface of the shell.

At 360, while the shell cools and shrinks, the inner surface of the shell and the second surface of the enclosed section of the sock liner are affixed to assemble an interim article.

At 370, to the interim article other features may be added, for example an outsole. The interim article is optionally exposed to heating conditions. When adhesive is present, the heating conditions dry the adhesive and/or cure the adhesive to form the boot. Upon heating, the boot is formed.

Thereafter, the boot may be further adorned and finished.

Boots disclosed herein are advantageous in that they provide a fit and wear that is sturdy, comfortable, lightweight, water-resistant, and optionally chemically-resistant.

EMBODIMENTS

Various embodiments are listed below. It will be understood that the embodiments listed below may be combined with all aspects and other embodiments in accordance with the scope of the invention.

Embodiment 1. A boot comprising: a shell comprising a first foamed polymeric material; a sock liner comprising a second foamed polymeric material, the sock liner having an exposed section and an enclosed section, the enclosed section being enclosed by the shell; and wherein there is an absence of intermingling of a second surface of the enclosed section of the sock liner with an inner surface of the shell.

Embodiment 2. The boot of embodiment 1, wherein the shell is a unitary layer. That is, the shell is preformed prior to fabrication of the boot.

Embodiment 3. The boot of embodiment 1 or 2 further comprising an adhesive layer affixing the inner surface of the shell and the second surface of the enclosed section of the sock liner.

Embodiment 4. The boot of any preceding embodiment, wherein the shell comprises a primary edge in contact with the sock liner, a front support section defined by a second edge of the shell, and a back support section defined by a third edge of the shell, wherein the primary edge extends between a front transition point with the second edge and a back transition point with the third edge such that the front transition point is at a distance from a top edge of the boot that is greater than a distance from the top edge of the boot of the back transition point.

Embodiment 5. The boot of embodiment 4, wherein the primary edge extends between the front transition point and the back transition point at an angle of greater than or equal to 30 degrees relative to the top edge of the boot.

Embodiment 6. The boot of embodiment 5, wherein the angle is greater than or equal to 45 degrees and less than or equal to 75 degrees relative to the top edge of the boot.

Embodiment 7. The boot of any preceding embodiment, wherein the shell further a comprises a heel counter that is continuous with a back support section.

Embodiment 8. The boot of any preceding embodiment, wherein the first foamed polymeric material of the shell comprises an ethylene vinyl acetate (EVA) polymer.

Embodiment 9. The boot of embodiment 8, wherein the first foamed polymeric material of the shell further comprises a chlorinated polyethylene.

Embodiment 10. The boot of embodiment 9, wherein the first foamed polymeric material comprises by weight the ethylene vinyl acetate (EVA) polymer in an amount in the range of from greater than to equal to 30% to less than or equal to 50%, and the chlorinated polyethylene in an amount in the range of from less than or equal to 70% to greater than or equal to 50%.

Embodiment 11. The boot of any preceding embodiment, wherein the second foamed polymeric material of the sock liner comprises natural rubber, polychloroprene, nitrile butadiene rubber, polyisoprene, desert guayule, or combinations thereof.

Embodiment 12. The boot of any preceding embodiment further comprising an outsole.

Embodiment 13. The boot of any preceding embodiment further comprising a midsole between the outsole and the shell.

Embodiment 14. A boot comprising: a shell comprising a foamed polymeric material comprising an ethylene vinyl acetate (EVA) polymer and a chlorinated polyurethane; a sock liner comprising a foamed neoprene material, the sock liner having an exposed section and an enclosed section; and an adhesive layer affixing an inner surface of the shell and a second surface of the enclosed section of the sock liner, and having a thickness spanning between the inner surface of the shell and the outer surface of the enclosed section of the sock liner; wherein there is an absence of intermingling of the second surface of the enclosed section of the sock liner with the inner surface of the shell.

Embodiment 15. The boot of embodiment 14, wherein the shell comprises a primary edge in contact with the sock liner, a front support section defined by a second edge of the shell, and a back support section defined by a third edge of the shell, wherein the primary edge extends between a front transition point with the second edge and a back transition point with the third edge such that the front transition point is at a distance from a top edge of the boot that is greater than a distance from the top edge of the boot of the back transition point.

Embodiment 16. The boot of embodiment 15, wherein the primary edge extends between the front transition point and the back transition point at an angle of greater than or equal to 45 degrees and less than or equal to 75 degrees relative to the top edge of the boot.

Embodiment 17. The boot of embodiment 14, wherein the shell further a comprises a heel counter that is continuous with a back support section.

Embodiment 18. The boot of embodiment 12, wherein the foamed polymeric material of the shell comprises by weight the ethylene vinyl acetate (EVA) polymer in an amount in the range of from greater than to equal to 30% to less than or equal to 50%, and the chlorinated polyethylene in an amount in the range of from less than or equal to 70% to greater than or equal to 50%.

Embodiment 19. The boot of any preceding claim in the form of a knee boot, a mid-calf boot, or an ankle boot.

Embodiment 20. The boot of any preceding claim wherein the foamed polymeric material of the shell comprises a density in a range of greater than or equal to 0.23 to 0.50 grams/cc.

Embodiment 21. A method of making a boot comprising: injecting a foamable polymeric material into a mold cavity to form a shell comprising a first foamed polymeric material; disposing a sock liner comprising a second foamed polymeric material on a boot last; supplying an adhesive to a surface of the sock liner, the shell, or both; assembling the boot last on which the sock liner is disposed and the shell; forming an adhesive layer between an inner surface of the shell and a second surface of an enclosed section of the sock liner, wherein there is an absence of intermingling of the second surface of the enclosed section of the sock liner with the inner surface of the shell; affixing the inner surface of the shell and the second surface of the enclosed section of the sock liner to assemble an interim article; and exposing the interim article to heating conditions for drying the adhesive and/or curing the adhesive to form the boot.

Embodiment 22. The method of embodiment 21, wherein a first adhesive-component is supplied to the second surface of the sock liner and a second adhesive-component is supplied to the inner surface of the shell such that upon contact and optionally heat, the first adhesive-component is reactive with the second adhesive-component to form the adhesive layer.

Embodiment 23. The method of embodiment 21 or 22, wherein during assembly of the boot last on which the sock liner is exposed and the shell, the shell is in an expanded state, and upon cooling and shrinkage of the shell, the adhesive layer is formed from the adhesive.

Embodiment 24. The method of embodiment 21 or 22, wherein the boot last is expandable, and wherein during assembly of the boot last on which the sock liner is exposed and the shell, the boot last is in a first deflated position, and upon supply of a pressure source to the boot last, the boot last moves from the first deflated position to a second inflated position thereby forming the adhesive layer from the adhesive.

Embodiment 25. A method of providing water-resistant and lightweight foot protection comprising: obtaining boot according any preceding embodiment; and donning the boot.

Embodiment 26. The method of embodiment 25, wherein upon exposure to liquids, a wearer's foot remains dry.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

What is claimed is:

1. A boot comprising:
   a shell comprising a first foamed polymeric material comprising an ethylene vinyl acetate (EVA) polymer and a chlorinated polyurethane; and
   a sock liner comprised of a second foamed polymeric material and comprising a liner inner surface and a second surface opposite the liner inner surface, the sock liner having an exposed section and an enclosed section, the enclosed section being enclosed by the shell;
   wherein there is an absence of intermingling of the second surface of the enclosed section of the sock liner with an inner surface of the shell.

2. The boot of claim 1, wherein the shell is a unitary layer.

3. The boot of claim 1 further comprising an adhesive layer affixing the inner surface of the shell and the second surface of the enclosed section of the sock liner.

4. The boot of claim 1, wherein the shell comprises a primary edge in contact with the sock liner, a front support section defined by a second edge of the shell, and a back support section defined by a third edge of the shell, wherein the primary edge extends between a front transition point with the second edge and a back transition point with the third edge such that the front transition point is at a distance from a top edge of the boot that is greater than a distance from the top edge of the boot of the back transition point.

5. The boot of claim 4, wherein the primary edge extends between the front transition point and the back transition point at an angle of greater than or equal to 30 degrees relative to the top edge of the boot.

6. The boot of claim 5, wherein the angle is greater than or equal to 45 degrees and less than or equal to 75 degrees relative to the top edge of the boot.

7. The boot of claim 1, wherein the shell further a comprises a heel counter that is continuous with a back support section.

8. The boot of claim 1, wherein the first foamed polymeric material comprises by weight the ethylene vinyl acetate (EVA) polymer in an amount in the range of from greater than to equal to 30% to less than or equal to 50%, and the chlorinated polyethylene in an amount in the range of from less than or equal to 70% to greater than or equal to 50%.

9. The boot of claim 1, wherein the second foamed polymeric material of the sock liner comprises natural rubber, polychloroprene, nitrile butadiene rubber, polyisoprene, desert guayule, or combinations thereof.

10. The boot of claim 1 further comprising an outsole, the boot optionally further comprising a midsole between the outsole and the shell.

11. A boot comprising:
a shell comprising a foamed polymeric material comprising an ethylene vinyl acetate (EVA) polymer and a chlorinated polyurethane;
a sock liner comprised of a foamed neoprene material and comprising a liner inner surface and a second surface opposite the liner inner surface, the sock liner having an exposed section and an enclosed section; and
an adhesive layer affixing an inner surface of the shell and the second surface of the enclosed section of the sock liner, and having a thickness spanning between the inner surface of the shell and the second surface of the enclosed section of the sock liner;
wherein there is an absence of intermingling of the second surface of the enclosed section of the sock liner with the inner surface of the shell.

12. The boot of claim 11, wherein the shell comprises a primary edge in contact with the sock liner, a front support section defined by a second edge of the shell, and a back support section defined by a third edge of the shell, wherein the primary edge extends between a front transition point with the second edge and a back transition point with the third edge such that the front transition point is at a distance from a top edge of the boot that is greater than a distance from the top edge of the boot of the back transition point.

13. The boot of claim 11, wherein the shell further comprises a heel counter that is continuous with a back support section.

14. The boot of claim 11, wherein the foamed polymeric material of the shell comprises by weight the ethylene vinyl acetate (EVA) polymer in an amount in the range of from greater than to equal to 30% to less than or equal to 50%, and the chlorinated polyethylene in an amount in the range of from less than or equal to 70% to greater than or equal to 50%.

15. A method of making a boot comprising:
injecting a foamable polymeric material into a mold cavity to form a shell comprising a first foamed polymeric material comprising an ethylene vinyl acetate (EVA) polymer and a chlorinated polyurethane;
disposing a sock liner comprised of a second foamed polymeric material and comprising a liner inner surface and a second surface opposite the liner inner surface on a boot last;
supplying an adhesive to a surface of the sock liner, the shell, or both;
assembling the boot last on which the sock liner is disposed and the shell;
forming an adhesive layer between an inner surface of the shell and the second surface of an enclosed section of the sock liner, wherein there is an absence of intermingling of the second surface of the enclosed section of the sock liner with the inner surface of the shell;
affixing the inner surface of the shell and the second surface of the enclosed section of the sock liner to assemble an interim article; and
exposing the interim article to heating conditions for drying the adhesive and/or curing the adhesive to form the boot.

16. The method of claim 15, wherein a first adhesive-component is supplied to the second surface of the sock liner and a second adhesive-component is supplied to the inner surface of the shell such that upon contact and optionally heat, the first adhesive-component is reactive with the second adhesive-component to form the adhesive layer.

17. The method of claim 15, wherein during assembly of the boot last on which the sock liner is exposed and the shell, the shell is in an expanded state, and upon cooling and shrinkage of the shell, the adhesive layer is formed from the adhesive.

18. The method of claim 15, wherein the boot last is expandable, and wherein during assembly of the boot last on which the sock liner is exposed and the shell, the boot last is in a first deflated position, and upon supply of a pressure source to the boot last, the boot last moves from the first deflated position to a second inflated position thereby forming the adhesive layer from the adhesive.

* * * * *